United States Patent Office 2,778,843
Patented Jan. 22, 1957

2,778,843
URANIUM CHELATES OF DI(SALICYLAL)ALKYL-ENEDIIMINE AND PROCESS FOR THEIR PREPARATION

Horace D. Brown, Plainfield, N. J., and Frederick J. Wolter, Cleveland, Ohio, assignors to the United States of America as represented by the United States Atomic Energy Commission No Drawing. Application April 25, 1949,
Serial No. 89,580

25 Claims. (Cl. 260—429.1)

This invention relates to compounds of uranium and to a process for their preparation, and it especially relates to a process for the separation of uranium from aqueous solutions. The present invention also relates to the extraction of uranium from organic solvent solutions of the uranium compounds of the subject invention.

Uranium values are present in several types of ores, such as pitchblende, carnotite, and monazite sands. In the case of monazite sands, the amount of uranium values present is low. For example, the $U_3O_8$ content is of the order of 0.4%. The major metal values in monazite sands are rare earth values, primarily as phosphates. Analyses of several samples of monazite sands showed them to contain rare earth oxides ($R_2O_3$) between 40 and 60% and between 19 and 29% $P_2O_5$. In addition, these monazite sands contained thorium values in the amount of 3 to 6.5% $ThO_2$, as well as small amounts of other materials.

By various processes, not forming a part of the present invention, uranium values can be recovered from the uranium-containing ores, including monazite sands. By these recovery processes, there are obtained aqueous solutions of uranium salts. In these solutions other metal salts are present; for example, in solutions obtained by treatment of monazite sand, thorium salts and rare earth metal salts are present. In other recovery processes uranium is obtained from uranium ores as dilute solutions of uranium salts substantially free of other metal salts.

With the development of neutronic reactors for the production of plutonium by neutron bombardment of $U^{238}$, it has been found that the neutrons which would normally escape from the reactor can be utilized by placing a blanket of thorium or thorium oxide around the reactor. These neutrons are absorbed by thorium, which is chiefly $Th^{232}$, to produce $Th^{233}$. The latter decays with a half-life of 23.5 minutes to $Pa^{233}$ which in turn decays with a half-life of 27.4 days to $U^{233}$. By the use of this thorium blanket desirable $Pa^{233}$ and $U^{233}$ are produced. By a suitable period of aging most of the $Pa^{233}$ will be converted to $U^{233}$. However, the maximum amount of $U^{233}$ that may be obtained will be about 1% based on the $Th^{232}$ content and in the usual case the $U^{233}$ content will be less than 0.1%. When the thorium blanket is used too long before separating the $U^{233}$ produced therein, some $U^{233}$ will fission and part of the fission fragments will consist, after aging, of at least some of the rare earth elements. In such a case, it will be necessary in recovering $U^{233}$ not only to separate $U^{233}$ from thorium, but also it will be necessary to separate $U^{233}$ from the radioactive rare earth fission products.

It is an object of the present invention to provide new compounds of uranium.

A second object of this invention is to provide a process for the preparation of these new compounds of uranium.

A third object of the present invention is to provide a process for the separation of uranium from an aqueous solution of a uranium salt.

Another object of this invention is to separate uranium from a mixture of uranium and rare earth metals and from a mixture of uranium and rare earth fission products.

A further object of the present invention is to separate uranium from an organic solvent solution of the uranium compound of the subject invention.

It is also an object of this invention to provide a process for separating uranium from its solution as the uranium compound of this invention in the organic solvent used to extract uranium by this invention from aqueous solutions.

Other objects of this invention will be apparent from the description which follows.

The new compounds of uranium of this invention are chelate compounds of tetravalent uranium, U(IV), and a di(salicylal)alkylenediimine in which the diimine is represented by the general formula:

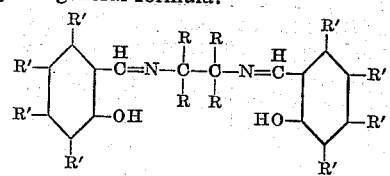

wherein R is a member of the group consisting of hydrogen and alkyl radicals and R' represents a wide variety of radicals including hydrogen, a halogen, a nitro group, an alkyl group and an aryl group. These diimines are broadly termed di(salicylal)alkylenediimines wherein the divalent alkylene radical contains at least two carbon atoms and joins the two nitrogen atoms by means of two carbon atoms. The tetravalent uranium chelate compounds are water-insoluble and are destroyed by aqueous acidic solutions having pH values of less than 2. They are soluble in substantially water-immiscible organic solvents. These chelate compounds may be used, for example, to coat foil which can be used in a neutron-detecting ion chamber, where uranium will fission by neutron-bombardment producing $\beta$- and $\gamma$-radiation that will be detected in the chamber.

Examples of the diimines, from which these chelate compounds are suitably prepared, are as follows:

Di(salicylal)ethylenediimine (i. e., di(2-hydroxybenzal)-ethylenediimine)
Di(2-hydroxy-3-methoxybenzal)ethylenediimine
Di(2-hydroxy-5-methylbenzal)ethylenediimine
Di(2,3-dihydroxy-6-phenylbenzal)ethylenediimine
Di(2-hydroxy-3-nitrobenzal)ethylenediimine
Di(2-hydroxy-3-bromobenzal)ethylenediimine
Di(2-hydroxy-5-chlorobenzal)ethylenediimine
Di(2-hydroxy-3-chlorobenzal)ethylenediimine
Di(2-hydroxy-3,5-dichlorobenzal)ethylenediimine
Di(2-hydroxy-3-chloro-5-tert-butylbenzal)ethylenediimine
Di(2-hydroxy-3-bromo-5-tert-butylbenzal)ethylenediimine
Di(2-hydroxy-3-isopropyl-5-chloro-6-methylbenzal)ethylenediimine
Di(2-hydroxy-3,5-dimethylbenzal)ethylenediimine
Di(2-hydroxy-3-chloro-4-tert-butylbenzal)ethylenediimine
Di(2-hydroxy-5-tert-butylbenzal)ethylenediimine
Di(2-hydroxy-5-chloro-6-methylbenzal)ethylenediimine
Di(2,3 - dihydroxy - 5 or 6 - tert-butylbenzal)ethylenediimine [1]
Di(2-hydroxy-5-tert-amylbenzal)ethylenediimine
Di(2-hydroxy-3-methyl-5-tert-butylbenzal)ethylenediimine
Di(diamylsalicylal)ethylenediimine [2]
Di(2-hydroxy-(6-methyl-5-tert-butyl-and / or-4-methyl-5-tert-butyl)-benzal)ethylenediimine [3]
Di(2-hydroxy-4,6-dimethylbenzal)ethylenediimine
Di(salicylal)propylene-1,2-diimine

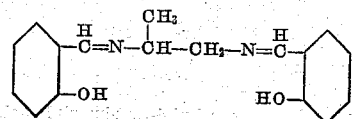

Footnotes in following column.

Di(salicylal)butylene-1,2-diimine

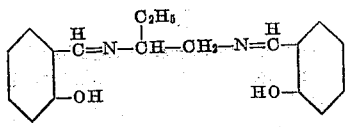

Di(salicylal)butylene-2,3-diimine

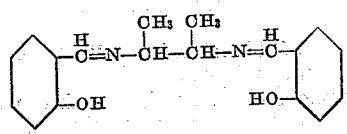

We have also found that these tetravalent uranium chelate compounds can be made by contacting an aqueous solution containing a tetravalent uranium salt, such as $UCl_4$ and $U(NO_3)_4$, and having a pH between 2 and 7 with the di(salicylal)alkylenediimine. The diimine and uranium react to form a water-insoluble compound. Two molecules of the diimine react with uranium by replacing hydrogen atoms of the 2-hydroxyl groups. Also, tetravalent uranium having a coordination number of eight forms a coordinate bond with the two nitrogen atoms of each molecule of the diimine, wherein uranium shares electrons of the nitrogen atoms. The chelate compound precipitates from the aqueous solution. It is separated by filtration or other suitable means. The diimine may be used as an organic solvent solution and then the chelate compound is prepared by contacting the aqueous solution with this organic solvent solution and separating an aqueous phase and an organic solvent phase containing the chelate compound. For some solvents a true solution is not formed; instead, the solvent removes the chelate compound by a preferential wetting action. Of course, the diimine may be used alone in the initial contacting with the aqueous solution and the organic solvent added before removal of chelate compound. The organic solvent phase may be treated further to recover the chelate compound by removing the organic solvent, for example, by volatilization.

In another embodiment of this invention, uranium is separated from the aqueous solution containing its tetravalent salt and having a pH between 2 and 7 by contacting with an organic solvent solution of the diimine, and separating an aqueous phase and an organic solvent extract phase containing the uranium chelate compound.

In the foregoing process for the preparation of the uranium chelate compound, it is preferred to use less than the stoichiometric amount of the diimine, so that resultant product is substantially free of unreacted diimine. However, in the second embodiment, wherein the process is for the separation of uranium, it is preferred that greater than a stoichiometric amount of diimine is used so that the maximum amount of uranium is chelated-extracted from the aqueous solution.

The pH of between 2 and 7, preferably between 2 and 6, for the aqueous solution of a tetravalent uranium salt is maintained by an acetate buffer in a suitable concentration. An acetate buffer comprises acetic acid, an alkali acetate, such as sodium acetate and ammonium acetate, and mixtures of acetic acid and alkali acetate. The

[1] The position of the tert-butyl group has not been established. An o-hydroxybenzaldehyde was prepared from 2-hydroxy-4-tert-butylphenol according to the Duff method (J. Chem. Soc. 1941, 547–50) by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.
[2] The parent o-hydroxyaldehyde was prepared by the Duff reaction, supra, from commercially available "diamylphenol."
[3] The parent o-hydroxyaldehyde was prepared by the Duff reaction, supra, from 3-methyl-4-tert-butylphenol. Two isomers are possible, but no attempt was made to identify the aldehyde.

amounts of acetate buffer required for maintaining particular pH values are easily determined. On p. 509 of "Reference Book of Inorganic Chemistry" by Latimer and Hildebrand, revised edition, published in 1940, the concentrations of sodium acetate and acetic acid for various pH values are given. The concentrations of ammonium acetate or mixtures of ammonium acetate and acetic acid that will provide certain pH values are as follows:

| For pH of— | Concentration of Ammonium Acetate, M | Concentration of Acetic Acid, M |
|---|---|---|
| 3 | 0.03 | 1.65 |
| 4 | 0.1 | 0.55 |
| 5 | 0.2 | 0.11 |
| 6 | 0.9 | 0.05 |
| 7 | 1.0 | 0 |

If the aqueous solution before the addition of acetate buffer contains free inorganic acid, such as nitric acid and hydrochloric acid, so that the solution has a pH less than 2, the excess acid can be eliminated by adding alkali acetate in an amount sufficient to neutralize inorganic acid as well as to provide the required amount of alkali acetate buffer. If the reaction between inorganic acid and alkali acetate does not provide the requisite amount of acetic acid for the desired pH value, acetic acid is added. Of course, when the initial aqueous solution has a very great concentration of inorganic acid, part of the acid may be neutralized by the use of a strong base, such as sodium hydroxide.

The organic solvent for the present invention is a substantially water-immiscible organic compound which is liquid at the temperature of carrying out the separation and preparation processes. Examples of suitable types of organic solvents are: halogenated hydrocarbons; hydrocarbons; alcohols; ethers; esters; ketones; and nitroparaffins. Specific examples are: chloroform; carbon tetrachloride; trichloroethylene; chlorobenzene; hexafluoroxylene; petroleum ether (having a boiling range between 35 and 55° C.); benzene; toluene; xylene, such as p-xylene; benzyl alcohol; cyclohexanol; diisopropyl ether; diethyl ether; n-butyl acetate; methyl isobutyl ketone; cyclohexanone; and nitroethane.

The efficiency of chelation-extraction is not identical for all the di(salicylal)alkylenediimines. The amount of, or the concentration in the organic solvent of, the chelating agent, i. e., the di(salicylal)alkylenediimine, may be varied widely. For any particular operation the concentration will vary with the concentration of tetravalent uranium salt in the aqueous solution. The ratio of organic solvent solution to aqueous solution may be varied widely, and the preferred range is between 5 to 1 and 1 to 5. The temperature at which the process is carried out may be varied considerably, for example, between room temperature and 95° C.

In the preparation and extraction processes the time of contact between the aqueous solution and the diimine varies with the temperature, the uranium concentration, and the degree of chelation-extraction desired. Using tracer solutions, such as $10^{-8}$ M U(IV) salt, a period of one to eight minutes at room temperature is adequate; however, with higher concentrations of uranium, a contact time of at least one-half hour is preferred.

In another aspect of the second embodiment of the process of this invention, the aqueous solution also contains natural-occurring rare earth metal salts or salts of rare earth fission products. In this case, uranium is chelated-extracted and the trivalent rare earth values remain in the aqueous solution. Thus, a mixture of uranium and trivalent rare earth values may be separated by forming an aqueous solution thereof with uranium in the tetravalent state, using a suitable reducing agent if the dissolution produced a uranyl salt, providing the requisite pH by means of the acetate buffer, and then chelating-extracting as described above.

In a third embodiment of the present invention, uranium is separated from a solution in a substantially water-immiscible organic solvent of a tetravalent uranium chelate compound of this invention by contacting said solution with an aqueous acidic solution having a pH less than 2 and separating an organic solvent phase and aqueous extract phase containing a uranium salt.

A further embodiment comprises a combination of the second and third embodiments, whereby uranium is transferred from one aqueous solution to another aqueous solution through the intermediate chelation-extraction. This combination is useful, for example, when sodium uranyl acetate, $NaUO_2(OAc)_3$, has been dissolved and it is desirable to have a uranium solution free of sodium cations. Uranium is reduced to the tetravalent state and the combination process is carried out. The final aqueous solution of uranium salt contains no sodium cations.

Other embodiments will be apparent to those skilled in the art.

The following examples taken either alone or in combination are illustrative of the foregoing embodiments of the invention, both compounds and process. Di(2,3-dihydroxy-5 or 6-tert-butylbenzal)diethylenediamine is refererd to in the examples as "Disal." The experiments were carried out at room temperature.

EXAMPLE I

An ethyl alcohol solution of di(salicylal)ethylenediimine, i. e., di(2-hydroxybenzal)ethylenediimine, and uranous acetate, $U(OOCCH_3)_4$, was refluxed and a small amount of reddish-brown insoluble material was obtained. This material has a melting point of at least 300° C. and was soluble in pyridine and a nitroethane. The percentages of the individual chemical elements in the material were determined by an ultimate analysis of the material and are presented below in Table I along with the calculated percentages of these elements, in which the calculations were based upon the formula $U(C_{16}H_{14}O_2N_2)_2$. The material obtained was the chelate compound of di(salicylal)ethylenediimine and had the structural formula:

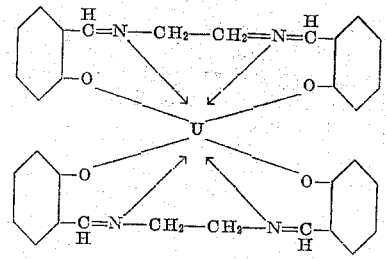

Table I

| Element | Percent | |
|---|---|---|
| | Calculated | Experimental |
| U | 30.9 | 33.8. |
| C | 49.9 | 48.4. |
| N | 7.3 | 6.9. |
| H | 3.6 | 4.0. |
| O | 8.3 | 6.9 (by difference). |

EXAMPLE II

A uranium tetrahydroxide precipitate was contacted with a chloroform solution of di(salicylal)ethylenediimine. The hydroxide was slowly attacked and the chloroform layer gradually acquired the red color of the tetravalent uranium complex or chelate compound.

EXAMPLE III

The following aqueous solutions each containing an acetate buffer were prepared: an aqueous solution containing a uranyl salt; an aqueous solution containing a few milligrams of a tetravalent uranium salt, namely, $UCl_4$; an aqueous solution containing a tetravalent thorium salt; and an aqueous solution containing a tetravalent zirconium salt. These solutions were contacted with chloroform solutions of "Disal." After separation of the aqueous and chloroform phases, they were analyzed for the distribution of the metal values. Uranium and thorium were determined by alpha-counting and zirconium was determined by means of p-dimethylaminoazophenylarsonic acid. The percentage of the cation extracted for each experiment is presented below in Table II.

Table II

| Cation | pH of Aqueous Solution | Percent Metal Values Extracted |
|---|---|---|
| $UO_2^{++}$ | 3.74 | 24.3 |
| $U^{++++}$ | 4.02 | 59.3 |
| $Th^{++++}$ | 3.22 | 10.3 |
| $ZrO^{++}$ | 5.00 | <4 |

EXAMPLE IV

The behavior of "Disal" with various cations was determined by extraction experiments using tracer amounts and milligram amounts of ions from acetate-buffered solutions, 0.1 to 1 M in total acetate, and using chloroform as the organic solvent. The experiments were carried out in separatory funnels or in a microextraction apparatus in which agitation of phases was produced by a gas stream. In all cases, the volume of chloroform was equal to that of the aqueous solution. Tracer solutions contain concentrations of the order of $10^{-8}$ M.

Radioactive 33-year $Cs^{137}$ was used to determine the distribution of cesium in "Disal" extractions. Activities were measured by checking the radioactivity of $CsClO_4$ precipitates from the aqueous and organic solvent phases with a Geiger-Müller counter, which was the copper wall type with a mica window 5.2 mg./cm.$^2$ in thickness.

The behavior of barium was determined over a wide pH range wtih 12.8-day $Ba^{140}$. The tracer was recovered from the aqueous and organic solvent phases as $BaCO_3$ and the activity was determined with an electroscope of the Lauritsen quartz fiber type with a 2.4 mg./cm.$^2$ aluminum window.

A solution of $UX_1$ activity (24-day $Th^{234}$) was prepared by the ether extraction of uranyl nitrate. The buffered aqueous solution was extracted with "Disal" solution in chloroform, and the tracer was recovered by $La(OH)_3$ precipitations.

For extractions of zirconium, a sample of carrier-free zirconium tracer was used. Absorption measurements showed that the activity was at least 90% pure 68-day $Zr^{95}$. The tracer was recovered by $Fe(OH)_3$ precipitations and the activity determined with an electroscope.

The behavior of "Disal" solution in chloroform with tracer amounts of the various cations is summarized in Table III.

Table III

| Ion | pH of Aqueous Solution | Percent Activity Extracted |
|---|---|---|
| Cs$^+$ | 3.88 | 0.02 |
| | 4.28 | 0.02 |
| Ba$^{++}$ | 1.93 | 0.24 |
| | 3.35 | 12.5 |
| | 4.80 | 17.9 |
| | 5.12 | 22.6 |
| | 5.80 | 21.5 |
| Mixture of Ce$^{+++}$ and Y$^{+++}$ | 3.28 | 0.09 |
| | 3.85 | 0.37 |
| Th$^{++++}$ | 2.50 | 12.6 |
| | 3.82 | 25.0 |
| | 5.40 | 51.2 |
| | 6.20 | 61.0 |
| ZrO$^{++}$ | 1.20 | 12.2 |
| | 2.00 | 60.3 |
| | 2.90 | 83.3 |
| | 5.25 | 85.4 |

EXAMPLE V

Tracer solutions of salts of radioactive rare earth elements and buffered with ammonium acetate were contacted vigorously with equal volumes of chloroform solutions of di(salicylal)ethylenediimine and the two phases of each experiment were separated. The distribution of rare earth elements was determined by their radioactivities using an electroscope. The data are summarized below in Table IV.

Table IV

| pH of Aqueous Solution | Percent Rare Earth Elements Extracted |
| --- | --- |
| 5.34 | 1.4 |
| 5.54 | 1.3 |
| 5.76 | 0.8 |
| 6.00 | 0.7 |
| 6.27 | 1.3 |
| 6.50 | 0.8 |

The data in Examples III, IV, and V illustrate that uranium is separated from trivalent rare earth elements with a high degree of efficiency. The data also show that thorium will be chelated-extracted by the process of the present invention. After the extraction of thorium and tetravalent uranium values from the organic solvent solution of their chelate compounds by using an aqueous solution having a pH of less than 2, the uranium and thorium can be separated by other processes not forming a part of the present invention.

The examples, presented above, of this invention were batch experiments, but the chelation-extraction step and re-extraction step may be effected by the use of batch, continuous batch, batch countercurrent, or continuous countercurrent methods. It is preferred to use batch methods for the chelation-extraction step because of the time required for maximum chelation.

The foregoing illustrations and embodiments of this invention are not intended to limit its scope, which is to be limited entirely by the appended claims.

What is claimed is:

1. A tetravalent uranium chelate compound of a di(salicylal)alkylenediimine wherein the divalent alkylene radical contains at least two carbon atoms and joins the two nitrogen atoms by means of two carbon atoms.

2. A tetravalent uranium chelate compound of a di(salicylal)ethylenediimine.

3. A tetravalent uranium chelate compound of di(2,3-dihydroxy-tert-butylbenzal)ethylenediimine wherein the imine was prepared from 2-hydroxy-4-tert-butylphenol by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.

4. A tetravalent uranium chelate compound of di(2-hydroxy-3-chloro-5-tert-butylbenzal)ethylenediimine.

5. A tetravalent uranium chelate compound of di(2-hydroxybenzal)ethylenediimine.

6. A process for the preparation of a tetravalent uranium chelate compound of a di(salicylal)alkylenediimine wherein the divalent alkylene radical contains at least two carbon atoms and joins the two nitrogen atoms by means of two carbon atoms, which comprises contacting an aqueous solution containing a tetravalent uranium salt and maintained at a pH between 2 and 7 by an acetate buffer with said di(salicylal)alkylenediimine, and separating the resultant tetravalent uranium chelate compound.

7. The process of claim 6 in which the di(salicylal)-alkylenediimine is a di(salicylal)ethylenediimine.

8. A process for the preparation of a tetravalent uranium chelate compound of a di(salicylal)alkylenediimine wherein the divalent alkylene radical contains at least two carbon atoms and joins the two nitrogen atoms by means of two carbon atoms, which comprises contacting an aqueous solution containing a tetravalent uranium salt and maintained at a pH between 2 and 7 by an acetate buffer with a solution in a substantially water-immiscible organic solvent of said di(salicylal)alkylenediimine, and separating an aqueous phase and an organic solvent extract phase containing the tetravalent uranium chelate compound.

9. A process for the separation of uranium from an aqueous solution containing a salt of tetravalent uranium and containing an acetate buffer to provide a pH between 2 and 7, which comprises contacting said aqueous solution with a solution in a substantially water-immiscible organic solvent of a di(salicylal)ethylenediimine, and separating an aqueous phase and an organic solvent extract phase containing the resultant tetravalent uranium chelate compound.

10. The process of claim 9 in which the di(salicylal)-ethylenediimine is di(2,3-dihydroxy-tert-butylbenzal)ethylenediimine wherein the imine was prepared from 2-hydroxy-4-tert-butylphenol by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.

11. The process of claim 10 in which the organic solvent is chloroform and the pH of the aqueous solution is between 2 and 6.

12. The process of claim 9 in which the organic solvent is a xylene, the pH of the aqueous solution is between 2 and 6, and the di(salicylal)ethylenediimine is di(2,3-dihydroxy-tert-butylbenzal)ethylenediimine wherein the imine was prepared from 2-hydroxy-4-tert-butylphenol by reacting said phenol and hexamethylenetetramine in the presence of anhydrous glycerol and glyceroboric acid at 150° C., cooling to 110° C., adding sulfuric acid, recovering an o-hydroxybenzaldehyde derivative by steam distillation of the acidified reaction mixture, and condensing said salicylaldehyde derivative with ethylenediamine in a molal ratio of 2 to 1.

13. The process of claim 9 in which the organic solvent is methyl isobutyl ketone, the pH of the aqueous solution is between 2 and 6, and the di(salicylal)ethylenediimine is di(2,3-dihydroxy-tert-butylbenzal)ethylenediimine wherein the imine was prepared from 2-hydroxy-4-tert-butylphenol by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.

14. The process of claim 9 in which the organic solvent is chloroform, the pH of the aqueous solution is between 2 and 6, and the di(salicylal)ethylenediimine is di(2-hydroxy-3-chloro-5-tert-butylbenzal)ethylenediimine.

15. The process of claim 9 in which the organic solvent is chloroform, the pH of the aqueous solution is between 2 and 6, and the di(salicylal)ethylenediimine is di(2-hydroxybenzal)ethylenediimine.

16. A process for the separation of uranium from an aqueous solution containing a salt of tetravalent uranium and an acetate buffer to provide a pH between 2 and 7, which comprises contacting said aqueous solution with a solution in a substantially water-immiscible organic solvent of a di(salicylal)alkylenediimine wherein the divalent alkylene radical contains at least two carbon atoms and joins the two nitrogen atoms by means of two carbon atoms, separating an aqueous phase and an organic solvent extract phase containing the resultant tetravalent uranium chelate compound, contacting said organic solvent extract phase with an aqueous acidic solution having a pH of less than 2, and separating an organic solvent phase and an aqueous extract phase containing a uranium salt.

17. A process for the separation of uranium from a mixture of uranium and rare earth elements, which comprises dissolving said mixture in an acid solution, providing an acetate buffer in an amount sufficient to provide a pH of the aqueous solution between 2 and 7, contacting the resultant aqueous solution containing a tetravalent uranium salt and trivalent rare earth salts with a solution in a substantially water-immiscible organic solvent of a di(salicylal)alkylenediimine wherein the divalent alkylene radical contains at least two carbon atoms and joins the two nitrogen atoms by means of two carbon atoms, and separating an aqueous phase containing salts of said rare earth elements and an organic solvent extract phase containing the resultant tetravalent uranium chelate compound.

18. A process for the separation of uranium from a substantially water-immiscible organic solvent solution of a tetravalent uranium chelate compound of di(salicylal)-alkylenediimine wherein the divalent alkylene radical contains at least two carbon atoms and joins the two nitrogen atoms by means of two carbon atoms, which comprises contacting said organic solvent solution with an acidic aqueous solution having a pH less than 2, and separating an organic solvent phase and an aqueous extract phase containing a uranium compound.

19. The process of claim 18 in which the tetravalent uranium chelate compound is a chelate compound of di-(2,3-dihydroxy-tert-butylbenzal)ethylenediimine wherein the imine was prepared from 2-hydroxy-4-tert-butylphenol by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.

20. The process of claim 18 in which the tetravalent uranium chelate compound is a chelate compound of di(2-hydroxy-3-chloro-5-tert-butylbenzal)ethylenediimine.

21. The process of claim 18 in which the tetravalent uranium chelate compound is a chelate compound of di(2-hydroxybenzal)ethylenediimine.

22. A process for the separation of uranium and thorium from a mixture of uranium, thorium, and rare earth elements, which comprises dissolving said mixture in an acid solution, providing an acetate buffer in an amount sufficient to provide a pH of the aqueous solution between 2 and 7, contacting the resultant aqueous solution containing the tetravalent uranium salt, a thorium salt, and trivalent rare earth salts with a solution in a substantially water-immiscible organic solvent of a di(salicylal)alkylenediimine wherein the divalent alkylene radical contains at least two carbon atoms and joins the two nitrogen atoms by means of two carbon atoms, and separating an aqueous phase containing salts of said rare earth elements and an organic solvent extract phase containing the resultant tetravalent uranium chelate compound and thorium chelate compound.

23. The process of claim 22 in which the organic solvent is chloroform and the di(salicylal)alkylenediimine is di(2,3-dihydroxy-tert-butylbenzal)ethylenediimine prepared from 2-hydroxy-4-tert-butylphenol by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.

24. A process for the separation of thorium from a mixture of thorium and rare earth elements, which comprises dissolving said mixture in an acid solution, providing an acetate buffer in an amount sufficient to provide a pH of the aqueous solution between 2 and 7, contacting the resultant aqueous solution containing a thorium salt and trivalent rare earth salts with a solution in a substantially water-immiscible organic solvent of a di(salicylal)alkylenediimine wherein the divalent alkylene radical contains at least two carbon atoms and joins the two nitrogen atoms by means of two carbon atoms, and separating an aqueous phase containing salts of said rare earth and an organic solvent extract phase containing the resultant thorium chelate compound.

25. The process of claim 24 in which the organic solvent is chloroform and the di(salicylal)alkylenediimine is di(2,3-dihydroxy-tert-butylbenzal)ethylenediimine prepared from 2-hydroxy-4-tert-butylphenol by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.

No references cited.